United States Patent [19]
Tench et al.

[11] Patent Number: 6,111,685
[45] Date of Patent: Aug. 29, 2000

[54] REVERSIBLE ELECTROCHEMICAL MIRROR (REM) WITH IMPROVED ELECTROLYTIC SOLUTION

[75] Inventors: D. Morgan Tench; Leslie F. Warren, Jr., both of Camarillo; Michael A. Cunningham, Thousand Oaks, all of Calif.

[73] Assignee: Rockwell Science Center, LLC, Thousand Oaks, Calif.

[21] Appl. No.: 09/356,730

[22] Filed: Jul. 19, 1999

Related U.S. Application Data

[63] Continuation-in-part of application No. 09/333,385, Jun. 15, 1999, which is a continuation-in-part of application No. 08/994,412, Dec. 19, 1997, Pat. No. 5,923,456.

[51] Int. Cl.$^7$ ...................................................... G02F 1/153
[52] U.S. Cl. ......................... 359/267; 359/268; 359/270; 359/272; 359/273; 359/274
[58] Field of Search ................................... 359/265, 267, 359/268, 270, 272, 273, 274

[56] References Cited

U.S. PATENT DOCUMENTS

| | | | |
|---|---|---|---|
| 5,056,899 | 10/1991 | Warszawski | 359/265 |
| 5,855,755 | 1/1999 | Murphy et al. | 205/122 |
| 5,923,456 | 7/1999 | Tench et al. | 359/266 |
| 5,948,232 | 9/1999 | Murphy et al. | 205/122 |
| 5,998,617 | 12/1999 | Srinivasa et al. | 544/347 |
| 6,020,987 | 1/1999 | Baumann et al. | 359/273 |

FOREIGN PATENT DOCUMENTS

| | | |
|---|---|---|
| 0618477 | 10/1994 | European Pat. Off. . |
| 8107895 | 4/1981 | France . |

OTHER PUBLICATIONS

J. Duchene et al, "Electrolytic Display", *IEEE Transactions on Electron Devices*, vol. ED–26, No. 8, pp 1243–1245, (Aug. 1979).

Bruce M. Howard et al, "Reversible Electrodeposition of Bismuth Thin Films for Flat Panel Display Applications", *Proc. Symp. on Electrochemically Deposited Thin Film*, San Diego, CA, Proc. vol. 93–26, pp 353–361, (1993).

John P. Ziegler et al, "Applications of reversible electrodeposition electrochromic devices", *Solar Energy Materials and Solar Cells*, vol. 39, pp 317–331, (1995).

John P. Ziegler et al, "Nucleation and Growth of Thin Film Reversible Electrodeposition Electrochromic Materials", *The Electrochemical Society Proceedings*, vol. 94–31, pp 23–33, (1994).

*Primary Examiner*—Georgia Epps
*Assistant Examiner*—Evelyn A. Lester
*Attorney, Agent, or Firm*—Koppel & Jacobs

[57] ABSTRACT

A reversible electrochemical mirror (REM) includes a first electrode and a second electrode, one of which is substantially transparent to at least a portion of the spectrum of electromagnetic radiation. An electrolytic solution, disposed between the first and second electrodes, contains ions of a metal which can electrodeposit on the electrodes. The electrolytic solution also contains halide and/or pseudohalide anions having a total molar concentration ratio of at least 6:1 compared to that of the electrodepositable metal. A negative electrical potential applied to the first electrode causes deposited metal to be dissolved from the second electrode into the electrolytic solution and to be electrodeposited from the solution onto the first electrode to form a mirror deposit, thereby affecting the reflectivity of the REM device for electromagnetic radiation. A positive electrical potential applied to the first electrode causes deposited metal to be dissolved from the first electrode into the solution and electrodeposited from the solution onto the second electrode, thereby decreasing the reflectivity of the REM mirror. It is usually necessary to apply a surface modification layer to the first electrode to ensure uniform nucleation so that a mirror electrodeposit having high reflectivity is obtained. The high molar concentration ratio of halide and/or pseudohalide anions to electrodepositable metal ions in the electrolyte provides the inherent electrolyte stability, high deposit quality, good deposit erasure and long cycle life needed for practical applications.

51 Claims, 3 Drawing Sheets

REVERSIBLE ELECTROCHEMICAL MIRROR (REM) WITH IMPROVED ELECTROLYTIC SOLUTION

CROSS-REFERENCE TO RELATED APPLICATIONS

This application is a continuation-in-part of application Ser. No. 09/333,385, filed Jun. 15, 1999, currently still pending which is a continuation-in-part of application Ser. No. 08/994,412, filed Dec. 19, 1997, which issued as U.S. Pat. No. 5,923,456 on Jul. 13, 1999.

BACKGROUND OF THE INVENTION

1. Field of the Invention

This invention is concerned with devices, such as mirrors and windows, having controllable reflectivity.

2. Description of the Related Art

Sunlight transmitted through windows in buildings and transportation vehicles can generate heat (via the greenhouse effect) that creates an uncomfortable environment and increases air conditioning requirements and costs. Current approaches to providing "smart windows" with adjustable transmission for use in various sunlight conditions involve the use of light absorbing materials. These approaches are only partially effective, since the window itself is heated and because these devices, such as electrochromic devices, are relatively expensive and exhibit limited durability and cycle life. Certain liquid crystal-based window systems switch between transmissive and opaque/scattering states, but these systems require substantial voltages to maintain the transparent state. There is an important need for an inexpensive, durable low voltage smart window with variable reflectivity. Reflecting the light, rather than absorbing it, is the most efficient means for avoiding inside heating.

In prior art attempts to exploit reversible electrodeposition of a metal for light modulation, the deposits obtained on transparent substrates presented a rough and black, gray, or sometimes colored appearance (typical of finely-divided metals) and exhibited poor reflectivity and high light absorbance, especially when thick. Such deposits have been investigated for display applications involving reflectance from the background, with white pigments often being added to improve contrast. Warszawski (U.S. Pat. No. 5,056,899), which is concerned with displays, teaches that reversible metal electrodeposition is most appropriate for display applications, since significant disadvantages for transmission devices were given (e.g., the possibility of metal deposition at the counter electrode). Such teachings imply that the application of reversible metal deposition to smart windows must involve light absorption by the finely divided electrodeposited metal, which would result in heating of the device itself and thus the space inside. The low reflectance of this type of deposit would not be appropriate for adjustable mirror applications. The prior art literature also teaches that, for transmission-type devices, reversible metal electrodeposition requires the use of an auxiliary counter electrode reaction; otherwise, metal would plate on the counter electrode as the deposit was de-plated from the working electrode.

Electrolytes described in the prior art literature contain auxiliary redox species (e.g., bromide, iodide, or chloride) that are oxidized (e.g., to bromine, iodine, or chlorine) at the counter electrode during metal deposition under the high drive voltages used. This introduces chemistry-related instabilities during long term operation and leads to deposit self erasure on open circuit via chemical dissolution of the metal deposit, e.g., $2Ag^0+Br_2\rightarrow 2AgBr$. In most cases, this auxiliary redox process hinders metal deposition at the counter electrode during erasure, introducing a threshold voltage that is desirable for display applications. This auxiliary redox process may represent a significant side reaction even when metal plating/deplating occurs at the counter electrode and a threshold voltage is not observed. See, e.g., Warszawski, columns 3–4 (when copper or nickel were present in the counter electrode paste) and Duchene et al., Electrolytic Display, IEEE Transactions on Electron Devices, Volume ED-26, Number 8, Pages 1243–1245 (August 1979); French Patent No. 2,504,290 (Oct. 22, 1982). High switching voltages of at least 1 V were used for all the electrodeposition devices which have been found in the patent and literature prior art.

A paper by Ziegler et al. (Electrochem. Soc. Proc. Vol. 93-26 (1993), p. 353) describes an investigation for display applications of the reversible electrodeposition of bismuth in aqueous solutions containing a large molar concentration ratio of halide anions to the trivalent bismuth ion. Halide anion oxidation served as the counter electrode reaction with the 1.5 volt write voltage used. The deposits obtained were dark in color and were shown to decrease the reflectance of the ITO surface. Subsequent reports by these authors (Electrochem. Soc. Proc. Vol. 94-31 (1994), p. 23; Solar Energy Mater. Solar Cells 39 (1995), p. 317) indicated that addition of copper ions to the electrolyte was necessary to attain complete deposit erasure. Thus, Ziegler et al. do not teach that a significant improvement in the deposit quality or erasability can be derived from use of a high molar concentration ratio of halide anion to electrodepositable metal ion in the electrolyte. These authors utilized a counter electrode reaction other than metal electrodeposition/dissolution and never obtained a mirror deposit.

Warszawski teaches that the use of a grid counter electrode would give a less uniform deposit since deposition on the transparent working electrode is highly localized in the vicinity of the counter electrode grid lines (a consequence of the very thin film of gel electrolyte used). Warszawski also teaches the use of an aqueous gel electrolyte to minimize sensitivity to atmospheric contaminants and to avoid the necessity of having a leak tight seal. Such electrolytes, however, have much more limited temperature and voltage operating ranges compared with organic-based electrolytes with high boiling solvents.

One effort to improve the deposit quality of the electrolytic solution used in a reversible electrodeposition process, described in U.S. Pat. No. 5,764,401 to Udaka et al.), requires the addition of organic additives to the solution. Unfortunately, such additives are typically destroyed during the electroplating process, greatly limiting cycle life. Furthermore, this approach fails to produce highly-reflective mirror-like deposits, which, due to their superior heat-rejecting characteristics, are desirable for many applications.

U.S. Pat. No. 5,880,872 to Udaka teaches that the "working" electrode of a reversible electrodeposition structure is degraded, and its working life thereby shortened, by the high voltage required to dissolve the metal film deposited upon it. Udaka states that this consequence can be avoided by adding an alkali metal halide to the device's electrolytic solution, preferably in an amount which provides an alkali metal halide to silver halide ratio of between 0.5 to 5. However, the described electrolytic formulation fails to provide the inherent stability, high quality deposits, good erasure and long cycle life needed for practical applications. Mirror deposits were never obtained.

Prior art literature teaches that the memory effect is temporary. This is a consequence of the occurrence of a counter electrode reaction other than metal plating/deplating. The energetic oxidation products generated at the counter electrode can cause dissolution of the metal deposit on the working electrode either chemically on open circuit (slow) or electrochemically during short circuit (fast).

Nishikitani et al. (European Patent No. 0,618,477) teaches that the counter electrode in electrochromic devices for smart window applications can be a metal grid which is substantially transparent. Since no metal electrodeposition occurs in electrochromic devices, however, the grid in this case is used to provide a transparent electrode, not to maintain transparency by localizing metal deposition. In addition, to provide adequate electrical capacity for electrochromic devices, Nishikitani's grid would need a very high surface area (at least 10 $m^2/g$ and preferably 50 to 5,000 $m^2/g$) and a line width of 50 to 5,000 $\mu$m; alternatively, a plurality of dots on a conducting substrate can be used, but the dots must contain fine particles having electrical capacitance of not less than 1 farad/g.

SUMMARY OF THE INVENTION

The reversible electrochemical mirror (REM) device of this invention permits efficient and precise control over the reflection of visible light and other electromagnetic radiation. The mirror device includes a first electrode, on which a mirror deposit is reversibly plated and dissolved, and a second electrode at which occurs the reverse of the metal plating/dissolution process occurring at the first electrode. At least one of the electrodes (and its substrate) is substantially transparent to at least a portion of the spectrum of electromagnetic radiation. Typically, the transparent electrode is indium tin oxide (ITO) or fluorine doped tin oxide (FTO) deposited on a transparent glass (or plastic) pane which serves as the substrate. An electrolytic solution is disposed between the first and second electrodes such that ions of a metal which can electrodeposit on these electrodes are soluble in the electrolytic solution. The electrolytic solution described herein provides the inherent stability, high deposit quality, complete deposit erasure and long cycle life needed for practical applications.

When a negative electrical potential is applied to the first electrode relative to the second electrode, the applied potential causes deposited metal to be dissolved from the second electrode into the electrolytic solution and to be electrodeposited from the solution onto the first electrode as a mirror deposit, thereby affecting the reflectance of the REM device. An electrochemically stable surface modification layer deposited on the first electrode is usually required to facilitate substantially uniform nucleation of the electrodeposited metal in order to form a mirror deposit on the first electrode, such that the amount of deposited metal subsisting on the first electrode affects the reflectivity of the mirror for the radiation. The reflectivity of this mirror can be selectively adjusted from near 0% to almost 100%, depending on the amount of metal deposited on the conducting film. Conversely, when the polarity is reversed and a positive electrical potential is applied to the first electrode relative to the second electrode, the applied potential causes deposited metal to be dissolved from the first electrode and electrodeposited from the solution onto the second electrode, thereby reducing the reflectivity of the mirror.

In various embodiments, at least one of the electrodes and its substrate, are substantially transparent to at least a portion of the spectrum of electromagnetic radiation. For an adjustable reflectivity device, such as an automatically dimming mirror, either the first electrode and substrate are made transparent to enable adjustable reflectivity of light entering the device through the first electrode/substrate pane, or the second electrode and substrate are made transparent so that the radiation passes through the electrolyte to the mirror formed on the first electrode. The locally distributed electrode described in U.S. Pat. No. 5,903,382 to Tench et al., which is assigned to the same assignee as the present application, may be used to render the second electrode substantially transparent. For a device involving adjustable transmittance, such as a smart window, both electrodes are made substantially transparent to the radiation, as described in U.S. Pat. No. 5,923,456 to Tench et al., also assigned to the same assignee as the present application.

The first electrode may be disposed uniformly on a first substrate, or may be disposed in a pattern. The surface modification layer may be a thin layer (i.e., sufficiently thin to be nominally transparent) of an inert metal which is electrochemically more stable towards oxidation than the electrodeposited metal. An underlayer may be added between the first electrode and the surface modification layer to improve adhesion.

The electrolytic solution of this invention provides improved stability, deposit quality, deposit erasure and cycle life performance. The solution contains a solvent, electrodepositable mirror metal cations, and halide and/or pseudohalide anions, with the total molar concentration ratio of halide and/or pseudohalide anions relative to the electrodepositable metal cations being more than a 6:1, and preferably greater than about 10:1. Halide/pseudohalide anions may be derived from one or more halide/pseudohalide compounds, as well as from any compound used to provide the electrodepositable mirror metal cations. The electrolytic solution may include a gelling agent to form an aqueous or a non-aqueous gel electrolyte.

Further features and advantages of the invention will be apparent to those skilled in the art from the following detailed description, taken together with the accompanying drawings.

DETAILED DESCRIPTION OF THE INVENTION

Figure 1:
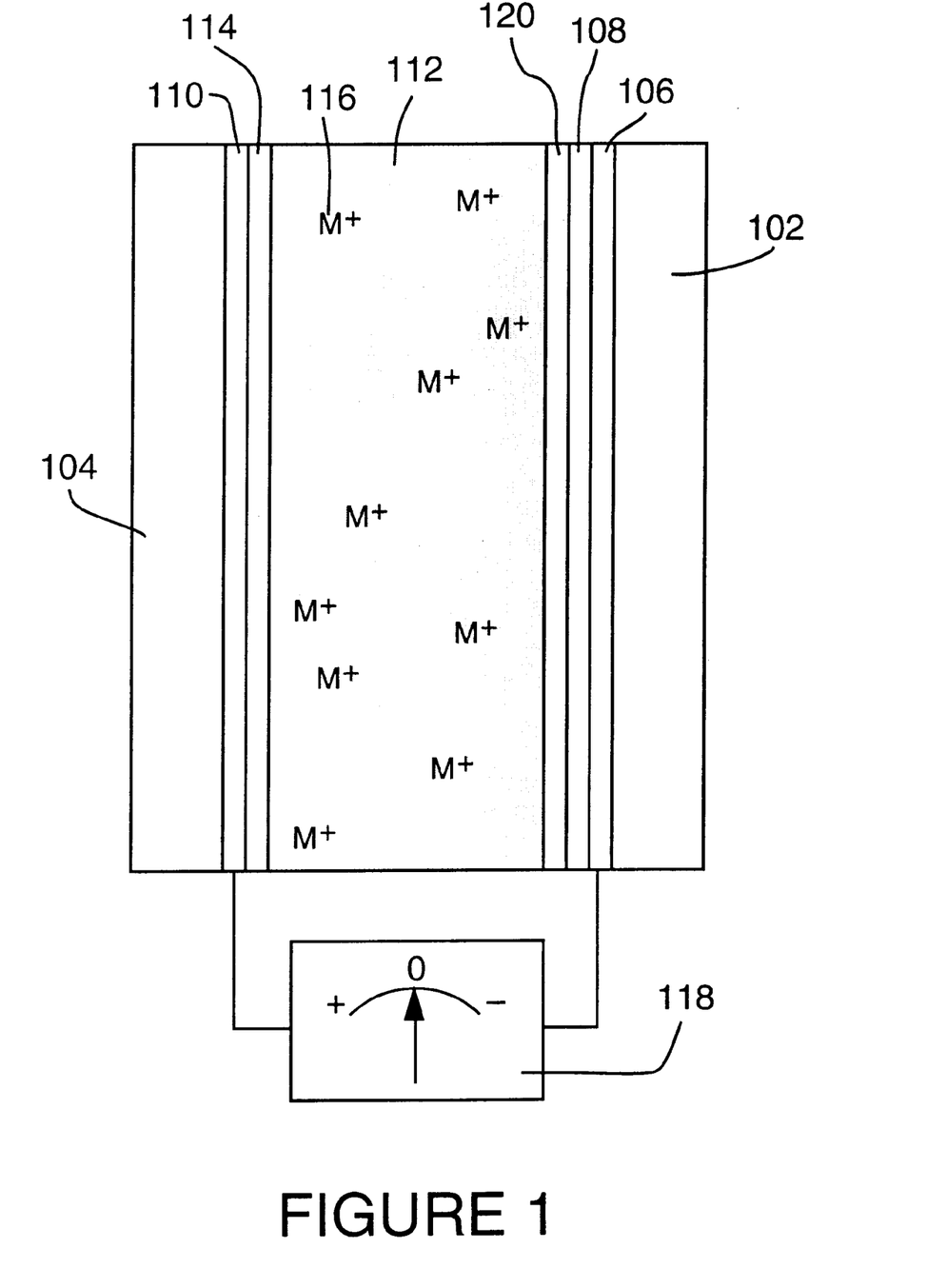
FIG. 1 is a cross sectional view depicting a representative design of a reversible electrochemical mirror (REM) device constructed according to the invention.

FIG. 1 is a cross sectional view depicting a representative design of a reversible electrochemical mirror (REM) constructed according to our invention (some dimensions, particularly layer thicknesses, are disproportionate in the drawings in order to more effectively illustrate the structure and function of the invention). The REM device in this example, which allows precise, reversible control over the reflection of electromagnetic radiation, includes a first substrate 102, which is substantially transparent to the portion of the spectrum of electromagnetic radiation which is to be controlled, and a second substrfate 104. An electrically conducting film 106, which is also substantially transparent, is deposited on the first substrate. The film 106, with the optional addition of an electrochemically stable surface modification layer 108, functions as a first electrode. A second electrode 110 is deposited on the second substrate 104. The second electrode can alternatively be a bulk electrode, a metal plate or sheet for example, with sufficient rigidity that the second substrate 104 would not be needed. The second electrode 110 is electrochemically stable or is covered with a sufficient thickness of an active metal layer 114 to avoid exposure of the second electrode surface. It may also be protected from exposure to the electrolyte by a coating of electrochemically stable metal. The surface of electrode 110 may be roughened to reduce reflection of radiation from the electrode or to improve switching speed by lowering the current density.

An electrolytic solution 112 is located between and in electrical contact with the electrodes 106 and 110. Solution 112 contains a solvent, electrodepositable mirror metal cations, and halide and/or pseudohalide anions, with the total molar concentration ratio of halide and/or pseudohalide anions relative to the electrodepositable metal cations being more than a 6:1. In the configuration depicted in FIG. 1, the mirror may be initially charged by depositing the metallic layer 114 on the electrode 110, i.e., the layer 114 is deposited on the electrode 110 prior to assembly of the REM cell. As those skilled in the art will appreciate, and as further explained in the discussion below regarding the operation of the REM, such a metallic layer may, alternatively, be initially deposited on the electrode 110, on the electrode 106 (i.e., on the surface modification layer 108 as a layer 120), or, as depicted FIG. 1, divided between a partial deposit on the electrode 106 and a partial deposit on the electrode 110. If the electrode 110 is not itself composed of the mirror metal, the amount of metal in these initially deposited layers constitutes the maximum amount of metal which will be available for deposit, as explained in more detail below, to control the reflectivity of the REM device. Metal ions 116, which contain the same metal atoms as the layers 114 and 120, are dissolved within the electrolytic solution 112 such that the metal atoms can be reversibly electrodeposited on and electrodissolved from the first and second electrodes. The surface modification layer 108 applied to the first electrode 106 facilitates the nucleation on this electrode of electrodeposited metal from the ions 116 to form a mirror deposit that highly reflects electromagnetic radiation.

The REM device is intended for use in conjunction with a source of electrical potential 118, which has a reversible polarity and adjustable or pre-set positive and negative potential values, connected between the first and second electrodes 106 and 110. When a negative electrical potential is applied to the first electrode 106 relative to the second electrode 110, metal 114 deposited on the second electrode 110 is dissolved from the second electrode into the electrolytic solution 112, while metal ions 116 in the solution are electrodeposited from the solution onto the surface modification layer 108 of the first electrode 106. The surface modification layer 108 causes the metal to deposit in a substantially uniform layer, forming a mirror surface.

When the polarity of the applied potential is reversed, such that a positive potential is applied to the first electrode 106 relative to the second electrode 110, deposited metal is dissolved from the first electrode into the solution 112 and dissolved metal will is electrodeposited from the solution onto the second electrode The amount of deposited metal which remains on the first electrode determines the reflectivity which the mirror demonstrates for radiation. The process is reversible, and the mirror may be maintained at virtually any point between substantially complete deposition on and substantially complete erasure from the first electrode 106 without additional current being required. Thus the REM mirror may be adjusted to any reflective value from approximately 0% reflective to approximately 100% reflective. The lower limit of reflectivity for the REM device is affected by the reflectivities of the nucleation layer 108, the electrode 106, and the substrate 102; these reflectivities may be reduced by use of anti-reflection coatings of the type commonly employed, or by adjusting the layer thicknesses.

Figure 2:
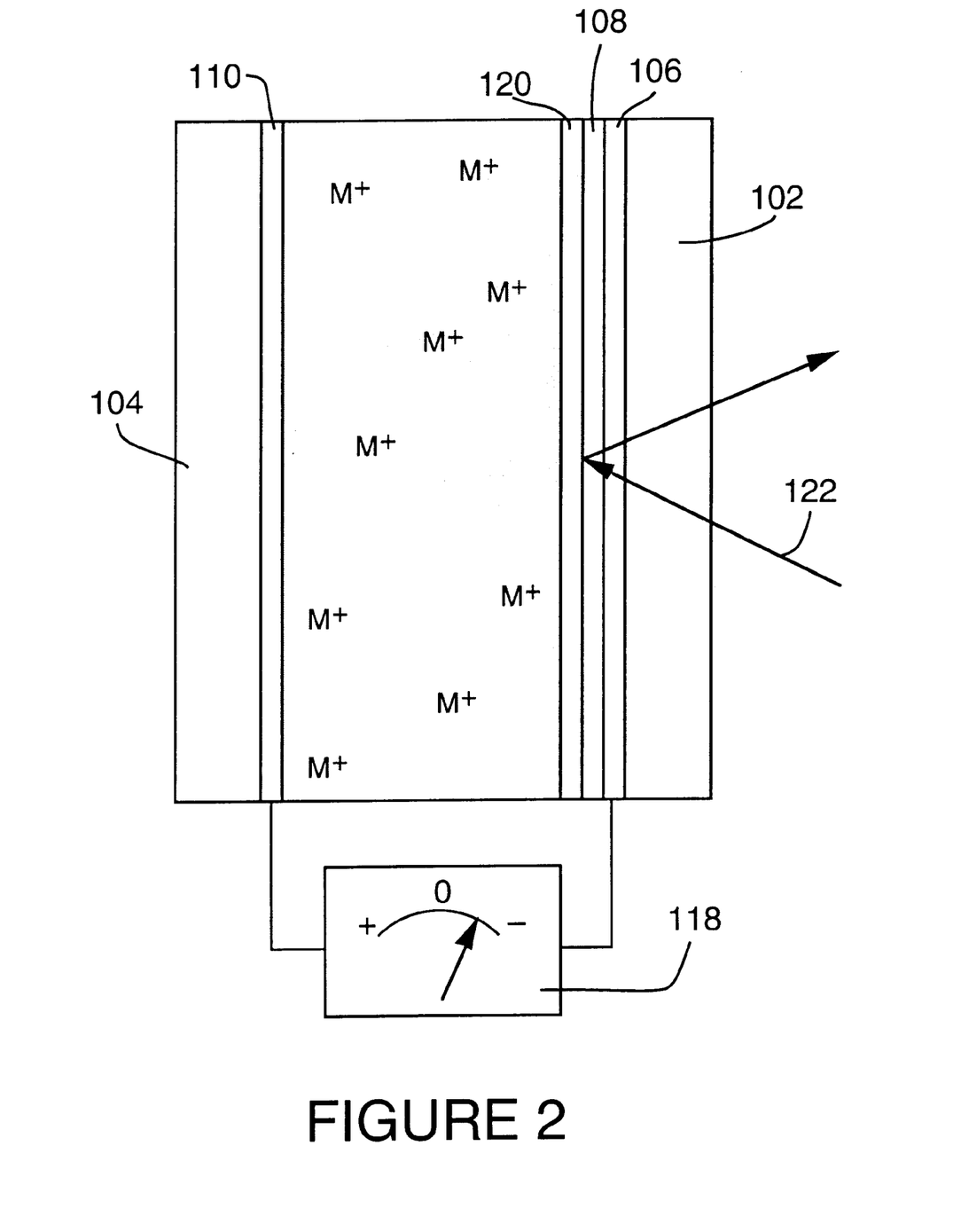
FIG. 2 is a cross sectional view similar to FIG. 1, but illustrating the configuration of the REM when sufficient negative electrical potential has been applied to the first electrode relative to the second electrode to cause substantial quantities of the metal to deposit onto the first electrode.

FIG. 2 is a cross sectional view similar to FIG. 1, but illustrating the performance of the REM device when sufficient negative electrical potential has been applied to the first electrode relative to the second electrode for a sufficient period of time to cause a substantial layer of the metal to deposit onto the first electrode. In this condition, the layer 120, created by the deposited metal, functions as a highly reflective mirror and tends to reflect radiation, illustrated by the light beam 122, which impinges on the mirror.

Figure 3:
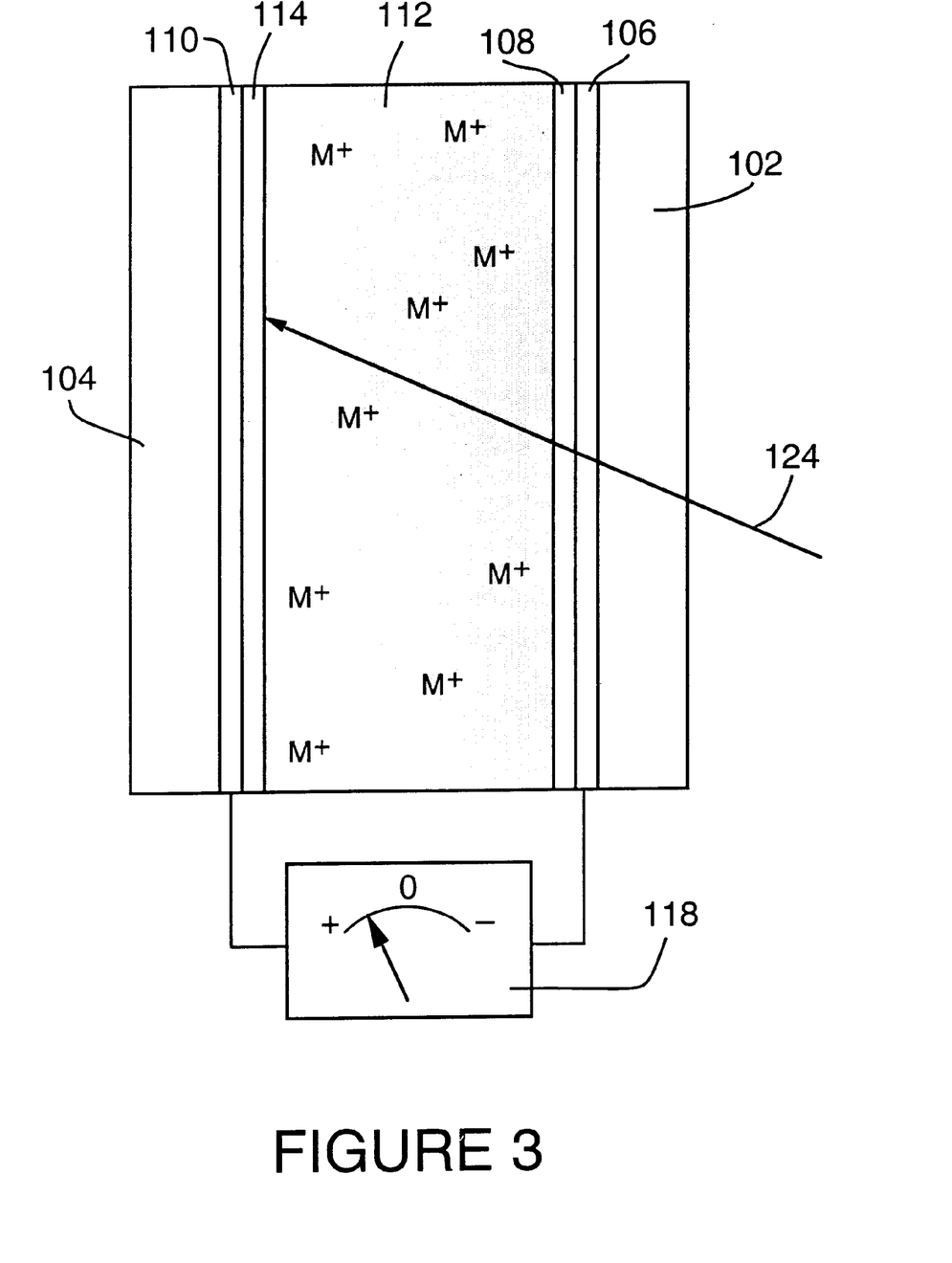
FIG. 3 is a cross sectional view similar to FIGS. 1 and 2, but depicting the status of the REM when sufficient positive electrical potential has been applied to the first electrode relative to the second electrode to cause substantially all of the metal to deposit on the second electrode.

FIG. 3 is a cross sectional view similar to FIGS. 1 and 2, but illustrating the behavior of the REM device when sufficient positive electrical potential has been applied to the first electrode relative to the second electrode for a sufficient period of time to cause substantially all of the electroactive metal to dissolve from the first electrode and to deposit as the metallic layer 114 on the second electrode. In this condition, the REM imposes a minimal impediment to incoming radiation, thereby allowing substantially all such incoming radiation of at least some wavelengths to be transmitted through the first electrode 106 and surface modification layer 108 and to then be absorbed or dispersed by the electrolyte 112 or by the deposited metal 114 on the second electrode 110, as illustrated by the light beam 124 Alternatively, the transmitted light might be absorbed or dispersed by a gel matrix if a gelled electrolyte is employed. An absorbing dye might also be added to the electrolyte to enhance light absorption. The second electrode 110 could also be a locally distributed electrode on a transparent substrate so that most of the radiation would pass through the device. For the configuration depicted in FIG. 3, the amount of reflected light is minimal.

In an alternative configuration, the first electrode can be disposed on a substrate that may be non-transparent, with the second electrode being essentially transparent and locally distributed on a transparent second substrate. In this variable reflectivity device, light entering through the second electrode and through the electrolyte can be reflected to varying degrees by the extent of mirror formation on the first electrode. The locally distributed electrode is described in U.S. Pat. No. 5,923,456 to Tench et al. and assigned to the same assignee as the present application.

The electrolytic solution 112 includes the following components:

1) a solvent. The solvent is preferably selected from the following group: dimethylsulfoxide (DMSO), ethylene glycol, propylene carbonate, dimethylformamide (DMF), gamma butyrolactone (GBL), water and mixtures of these solvents.
2) cations of an electrodepositable mirror metal(s). The electrodepositable metal(s) is preferably selected from the following group: silver, bismuth, copper, tin, cadmium, mercury, indium, lead, antimony, thallium and zinc.

3) at least one halide or pseudohalide compound having a cation that is not electroactive in the voltage range over which the REM is operated. The halide/pseudohalide compound(s) preferably includes a cation selected from the following group: lithium, sodium, potassium, rubidium, cesium, magnesium, calcium, strontium, barium, and hydrogen. Alternatively, the halide/pseudohalide compound can be an alkylammonium halide/pseudohalide salt. Halide/pseudohalide compound(s) having a cation that is not electroactive is added to the solution until the ratio of the total molar concentration of all halide/pseudohalide anions to the total molar concentration of all mirror metal cations is at least 6:1; a ratio of at least 10:1 being preferred. Halide/pseudohalide anions may be derived from compounds comprising the mirror metal cations and cations that do not react electrochemically under the REM conditions employed. The mirror metal may be an alloy comprised of more than one metallic element. In computing the halide/pseudohalide to mirror metal molar ratio, the total concentrations of all halide/pseudohalide anions and all mirror metal ions is used.

The use of a higher halide/pseudohalide anion to active metal cation molar concentration ratio as specified herein increases the degree to which the active metal ions are stabilized in the electrolyte (via completing with the halide/pseudohalide anions). The enhanced active metal ion stability increases the inherent stability of the solution against precipitation of the active metal or an insoluble metal compound and raises the overvoltage for deposition of the metal. It also facilitates electrodissolution and inhibits passivation of the mirror metal deposit for faster and more complete erasure and greatly increased device cycle life. The higher overvoltage improves the deposit uniformity and mirror quality by increasing overall resistance to current flow (so that variations in electrolyte resistive paths are less important), and by inhibiting deposition at micro-peaks in the substrate that can result in runaway dendritic deposit growth associated with the higher electric field present at such peaks.

A REM device as described herein, employing an electrolyte having a halide/pseudohalide anion to active metal ion molar concentration ratio of greater than 6:1, exhibited greater inherent electrolyte stability, enhanced mirror deposit quality, better erasure and longer cycle life when compared with devices using lower ratios, or which utilize other substances—such as organic additives—in their electrolyte formulations. A REM device was constructed employing a halide anion/silver ion molar concentration ratio of 13:1 in a DMSO solvent, with no other additives, which provided high-quality mirror deposits for 100,000 cycles. Good results were also obtained with other solvents, e.g., ethylene glycol, water, and ethylene glycol/water mixtures.

Prior art efforts using lower ratios, or which use complicated electrolyte formulations involving organic additives, have produced devices that are incapable of producing mirror-like deposits and/or which suffer from other performance problems. The novel technique described herein avoids the complications brought about by other approaches, and enables the straightforward fabrication of practical and reliable REM devices with long cycle life.

Fabrication of a Preferred Embodiment

The preferred first electrode utilizes a glass or plastic substrate which is uniformly coated on one side with an optically transparent, low resistivity (about 10 $\Omega$/square) ITO (indium tin oxide) or FTO (fluorine-doped tin oxide) film. An optically thin adherent inert metal, such as Pt, is vapor deposited, preferably by sputtering, onto the ITO or FTO surface to enhance the rate of nucleation for metal deposition to yield a mirror deposit; other electrochemically inert metals can also be used, e.g., gold, palladium, rhodium, iridium, ruthenium, rhenium, etc. It may be advantageous in some cases to employ a duplex metal film, e.g., Ti/Au or Cr/Au, in which the very thin underlayer metal (e.g., Ti or Cr) serves to improve adhesion of the noble metal nucleation layer to the substrate. This nucleation layer is not necessary for some REM systems, notably aqueous silver cyanide electrolytes. An electrical bus connection is formed around the perimeter of the ITO or FTO coating.

For REM devices involving adjustable transmittance, the preferred second electrode is locally distributed, as described in U.S. Pat. No. 5,903,382 to Tench et al., which is assigned to the same assignee as the present application. In this case, the second electrode comprises a metal grid or nucleation layer matrix pattern of relatively small overall area so that metal plated on the second electrode blocks only a small fraction of the radiation.

For adjustable reflectivity REM devices, the preferred second electrode includes a sheet of the mirror metal (silver, for example) or of another metal, which has been roughened (by bead blasting, for example) to reduce reflection of radiation from the second electrode. When the second electrode is not electrochemically stable under the operating conditions, an excess amount of mirror metal is used so that the second electrode is always covered with the mirror metal and is not exposed to the solution. Alternatively, a protective layer of an electrochemically inert metal, such as platinum, is used between the reactive substrate and the mirror metal. Prior to cell assembly, the second electrode, if other than the mirror metal, is plated with a quantity of mirror metal sufficient to provide the desired amount of reflectivity when deposited on the first electrode and to prevent exposure of the second electrode substrate metal to the electrolyte. (Alternatively, the first electrode can be plated with the mirror metal).

The preferred electrolyte is a gelled electrolyte that is both chemically and electrochemically stable except with regard to electrodeposition of the mirror metal. Preferably, the mirror metal is silver added to the electrolyte as a silver halide or pseudohalide and stabilized in the electrolyte by addition of an excess of halide/pseudohalide ions derived from addition of a compound having a cation that is not electroactive (e.g., lithium, sodium or potassium), with the resulting halide/pseudohalide anion to silver ion molar concentration ratio being at least 6:1 as described above. Other mirror metals having relatively low toxicity and good electrochemical characteristics include copper, tin, and bismuth. A mixture of halide/pseudohalide ions (chloride, iodide, bromide, cyanide and thiocyanate) may be employed. The solvent is chosen with respect to its freezing and boiling point to provide the desired temperature operating range, as well as good electrolyte stability and good mirror cycling characteristics. Preferred solvents include water, dimethylsulfoxide (DMSO), ethylene glycol, gamma-butyrolactone (GBL), dimethylformamide (DMF) and mixtures of these. Solubility considerations may limit the acceptable combinations of mirror metal salts, halide/pseudohalide compounds and solvents. Additives that are electroactive or decomposed during electrodeposition of the mirror metal, such as organic compounds normally used for leveling and brightening electrodeposits, should be avoided since they would limit the device cycle life.

Although the REM of this invention can be fabricated using a liquid electrolyte, use of an electrolyte stiffener is preferred to facilitate mirror fabrication, to minimize electrolyte loss that may affect mirror performance or create a chemical safety hazard, and to adhesively hold glass fragments formed during accidental breakage that could otherwise cause physical personal injury. Preferred electrolyte stiffeners include organic gelling agents, e.g., polyacrylonitrile (PAN), polyvinylalcohol (PVA), polyvinylacetate (PVOAc), and polymethylmethacrylate (PMMA), which dissolve in liquid electrolytes to form transparent plastic-like gels at ambient temperatures. With an appropriate amount of gelling agent, the electrolyte can retain much of the conductivity of the liquid electrolyte, yet be cut and applied as a "solid state" component. The specific organic polymer gelling agent is chosen based on gel stability and chemical and electrochemical compatibility with a given electrolyte and the metal mirror formation/erasure processes. Other possible electrolyte stiffeners include porous solid polymers that absorb large quantities of electrolyte, e.g., ormasils and porous polypropylene. In some cases, the solid polymer matrix may be formed by in situ polymerization of monomers dissolved in the electrolyte.

The reversible electrochemical cells of this invention can be fabricated using spacers and a polymer sealant, or using a gasket or o-ring to provide both the proper spacing and a seal. The spacer and seal materials must be chemically compatible with the electrolyte. Good results have been obtained with polypropylene spacers and silicone sealants. The preferred electrode separation is about 0.05–3.0 mm. Electrical contact is made to the metal bus on each electrode and connected to a voltage source for switching.

EXAMPLES

1. An adjustable reflectivity REM cell having a viewing area of 7.6×12.7 cm was constructed using a mirror electrode comprised of a 30 Å sputtered platinum nucleation layer on 11 ohm/square FTO film on a glass substrate. The counter electrode was a 25 $\mu$m thick silver foil (99.99% purity) that had been roughened by bead blasting (170 grit) and was mechanically supported by a thick plastic backing plate. The electrolyte was 0.15 M AgI+1.8 M LiCl (halide/silver molar concentration ratio of 13.0) in a DMSO solvent. A polypropylene frame provided a 2.4 mm cell spacing and a silicone o-ring provided a seal. This cell exhibited excellent mirror formation and erasure during deep cycling between −0.5 V (relative to the mirror electrode) for 25 s and +0.25 V for 65 s for 46,000 cycles. Mirror formation remained practically uniform, although redistribution of the counter electrode silver resulting in exposure of the backing plate was eventually observed. Separate experiments showed that exclusion of oxygen from the electrolyte is necessary to avoid chemical dissolution of silver metal that can cause mirror loss on open circuit and possibly contribute to silver metal redistribution.

2. An adjustable reflectivity REM cell having a viewing area of 7.6×12.7 cm was constructed using a mirror electrode comprised of a 30 Å sputtered platinum nucleation layer on 11 ohm/square FTO film on a glass substrate. The counter electrode was 25 $\mu$m thick silver electrodeposited from a commercial plating bath on a copper plate that had been roughened by sanding (400 grit). Cell fabrication procedures and the electrolyte were the same as for Example 1. This cell also exhibited excellent mirror formation and erasure and was cycled between −0.4 V for 25 s and +0.25 V for 65 s for 100,000 cycles without significant degradation in the mirror quality.

3. The following electrolytic solutions also provided highly reversible mirror plating/erasure on noble metal nucleation layers on 10 ohms/square ITO on glass substrates:

A. 3 M sodium iodide with 0.15 M silver iodide in water with a 60 Å Pt/ITO electrode (halide ion/silver ion molar concentration ratio of 21).

B. 1.8 M sodium iodide with 0.15 M silver iodide in 75% ethylene glycol in water with a 60 Å Pt/ITO electrode (halide ion/silver ion molar concentration ratio of 13).

C. 1.8 M sodium iodide with 0.15M silver iodide in 100% ethylene glycol with a 60 Å Pt/ITO electrode (halide ion/silver ion molar concentration ratio of 13).

D. 10.6 M sodium thiocyanate with 0.34 M silver perchlorate in water adjusted to pH 2.2 with 0.1 M tartaric acid with a 60 Å Ti/Au/ITO electrode (pseudohalide ion/silver ion molar ratio of 31.2).

Features of the Invention

To attain the uniform metal deposition needed for mirror-like reflectivity, it is usually necessary to treat the transparent conducting film of the first electrode to improve nucleation, e.g., by vapor deposition of a very thin, yet optically transparent (~15–200 Å) "seed" layer of a metal (e.g., platinum or gold) that is electrochemically inert over the operating voltage range of the device. This seed layer enhances the rate of nucleation so that mirror deposits are obtained. Other surface treatments (e.g., electrodeposition of an inert metal layer) could be used to improve metal nucleation and provide mirror deposits. In order to be effective for producing mirror deposits, the nucleation layer must be microscopically continuous, which may not be the case for some metallization treatments on some transparent conductor substrates. For example, the two-step process commonly used to metallize printed wiring boards prior to copper plating (involving palladium displacement of adsorbed tin ions) may not produce sufficiently continuous films with adequate adhesion. For special effects, e.g., a decorative mirror design, the transparent conductor (e.g., ITO or FTO) and/or the metal nucleation layer can be patterned as desired.

The electrolyte of this invention employs a relatively high molar concentration ratio of halide or pseudohalide anions to active metal cations (more than 6:1) in order to stabilize the electrolyte, improve mirror deposit quality, facilitate complete erasure, and improve device cycle life. This eliminates the need for other complexing agents or additives that may themselves be unstable during long-term cycling of the device. In some cases, however, it may be advantageous to use augmenting electrochemically stable additives that further inhibit the metal deposition process by complexing the mirror metal ions or adsorbing on the electrode surface. Most of the organic addition agents used in the plating industry to brighten and level deposits, however, are electrochemically consumed during the metal deposition process and would be inappropriate. For some systems, e.g., aqueous silver cyanide, mirror deposits may be obtained without the use of a noble metal nucleation layer.

No chemically reactive species are produced, since the same metal deposition/dissolution reaction occurs at both electrodes. As a result, a particular switched state is maintained indefinitely at open circuit if oxidizing contaminants are excluded from the cell.

The REM device of this invention is an electroreflective device (light reflection changed by application of voltage), rather than an electrochromic device (light absorption changed by applied voltage) as is typical of the devices taught in the prior art. REM devices can be designed to modulate reflectance and/or transmission of light.

The REM is operated well within the electrolyte and electrode/nucleation layer stability regions, so that excessive metal plating or deplating is not harmful. In fact, the REM is always self-limiting for erasure of the mirror electrode when biased within the voltage stability region, since the current will practically cease when the deposited metal is depleted from that electrode. By limiting the amount of mirror metal deposited on the second electrode prior to cell assembly, overplating of the first electrode under a protracted applied voltage can also be precluded.

No cell separator is required, since the same redox couple reaction (metal deposition/dissolution) involving a solid product takes place at both electrodes, so that side reactions are avoided. On the other hand, a porous cell separator, e.g., porous polypropylene, may be used to provide a matrix for containing a liquid electrolyte and to prevent shorting of the two electrodes in the event of extreme flexure of the cell.

A wide temperature operating range is obtained by using electrolytes based on high boiling organic solvents, e.g., dimethylsulfoxide, ethylene glycol, propylene carbonate, γ-butyrolactone, etc. Use of mixtures of these solvents can extend the temperature range to lower operating temperatures.

Use of a "solid state" gel electrolyte which incorporates an electrochemically inert polymer stiffener facilitates mirror fabrication, minimizes the possibility of chemical or physical personal injury, and reduces sensitivity to cell leakage and atmospheric contamination by preventing convectional transport (diffusion is a very slow process).

The preferred embodiments of this invention have been illustrated and described above. Modifications and additional embodiments, however, will undoubtedly be apparent to those skilled in the art. Furthermore, equivalent elements may be substituted for those illustrated and described herein, parts or connections might be reversed or otherwise interchanged, and certain features of the invention may be utilized independently of other features. Consequently, the exemplary embodiments should be considered illustrative, rather than inclusive, while the appended claims are more indicative of the full scope of the invention.

We claim:

1. A reversible electrochemical mirror device for controlling the reflection of electromagnetic radiation, comprising:
    a first electrode;
    a second electrode, at least one of said first and second electrodes being substantially transparent to at least a portion of the spectrum of electromagnetic radiation;
    an electrolytic solution disposed between and in electrical contact with the first and second electrodes, said electrolytic solution comprising:
        a solvent,
        a source of cations of at least one electrodepositable mirror metal,
        at least one halide and/or pseudohalide compound having cations that are not electroactive in the voltage range over which the device is operated, the ratio of the total molar concentration of halide and/or pseudohalide anions (where said total is the aggregate of anions originating from said halide and/or pseudohalide compound and anions originating from said source of said electrodepositable mirror metal cations) to the total molar concentration of said electrodepositable mirror metal cations being greater than 6:1; and
    a plurality of atoms of said electrodepositable mirror metal disposed on either the first or the second electrode,
    such that a negative electrical potential applied to the first electrode relative to the second electrode tends to cause deposited metal to be dissolved from the second electrode into the solution and to be electrodeposited from the solution as a mirror deposit onto the first electrode, and
    such that a positive electrical potential applied to the first electrode relative to the second electrode tends to cause deposited metal to be dissolved from the first electrode into the solution and electrodeposited from the solution onto the second electrode,
    the amount of deposited metal subsisting on the first electrode affecting the reflection of electromagnetic radiation by the device.

2. The device of claim 1, wherein said first electrode is substantially transparent to at least a portion of the spectrum of electromagnetic radiation.

3. The device of claim 2, further comprising a first substrate which is substantially transparent to at least a portion of the spectrum of electromagnetic radiation, the first electrode being disposed on the first substrate.

4. The device of claim 1, further comprising a surface modification layer on the first electrode.

5. The device of claim 1, wherein said second electrode is substantially transparent to at least a portion of the spectrum of electromagnetic radiation.

6. The device of claim 5, further comprising a second substrate which is substantially transparent to at least a portion of the spectrum of electromagnetic radiation, the second electrode being disposed on the second substrate.

7. The device of claim 5, wherein the second electrode is a locally distributed electrode.

8. The device of claim 1, further comprising a second substrate, the second electrode being deposited on the second substrate.

9. The device of claim 8, wherein the second substrate is an electrically insulating substrate and the second electrode is a continuous electrical conductor.

10. The device of claim 9, wherein the second electrode is an electrochemically stable metal deposited on the second substrate.

11. The device of claim 10, wherein the electrochemically stable metal of the second electrode includes at least one metal selected from the group consisting of Au, Cr, Ir, Ni, Os, Pd, Pt, Re, Rh, Ru and stainless steel.

12. The device of claim 8, further comprising an underlayer between the second electrode and the second substrate to improve adhesion between the second electrode and the second substrate.

13. The device of claim 12, wherein the underlayer includes at least one metal selected from the group consisting of aluminum, chromium, hafnium, molybdenum, nickel, titanium, tungsten and zirconium.

14. The device of claim 1, wherein the second electrode is a solid metallic electrode.

15. The device of claim 14, wherein the second electrode is a solid metallic electrode with an electrochemically stable metal deposited on the second substrate.

16. The device of claim 15, wherein the electrochemically stable metal on the second metallic electrode includes at least one metal selected from the group consisting of Au, Cr, Ir, Ni, Os, Pd, Pt, Re, Rh, Ru, and stainless steel.

17. The device of claim 15, further comprising an underlayer between the second metallic electrode and the electrochemically stable metal to improve adhesion between the second metallic electrode and the electrochemically stable metal.

18. The device of claim 17, wherein the underlayer includes at least one metal selected from the group consisting of aluminum, chromium, hafnium, molybdenum, nickel, titanium, tungsten and zirconium.

19. The device of claim 1, wherein the second electrode includes a roughened surface to reduce reflected radiation from the electrode.

20. The device of claim 3, wherein the first electrode is disposed uniformly on the first substrate.

21. The device of claim 3, wherein the first electrode is disposed in a pattern on the first substrate.

22. The device of claim 3, wherein the first electrode is an electrically conductive oxide coating deposited on the first substrate.

23. The device of claim 22, wherein the electrically conductive oxide coating is selected from the group consisting of aluminum (doped) zinc oxide, antimony (doped) tin oxide, fluorine (doped) tin oxide, indium oxide, indium tin oxide, fluorine (doped) indium oxide, aluminum (doped) tin oxide, phosphorus (doped) tin oxide, and indium zinc oxide.

24. The device of claim 4, wherein the surface modification layer is a thin layer of an electrochemically inert metal which is electrochemically more stable towards oxidation in the electrolytic solution than the electrodeposited mirror metal.

25. The device of claim 24, wherein the inert metal layer includes at least one metal selected from the group consisting of Au, Ir, Os, Pd, Pt, Re, Rh and Ru.

26. The device of claim 4, further comprising an underlayer between the first electrode and the surface modification layer to improve adhesion between the first electrode and the surface modification layer.

27. The device of claim 26, wherein the underlayer includes at least one metal selected from the group consisting of aluminum, chromium, hafnium, molybdenum, nickel, titanium, tungsten and zirconium.

28. The device of claim 1, further comprising first and second substrates, the first electrode being deposited on the first substrate and the second electrode being deposited on the second substrate, wherein at least one of the first and second substrates are glass.

29. The device of claim 1, further comprising first and second substrates, the first electrode being deposited on the first substrate and the second electrode being deposited on the second substrate, wherein at least one the first and second substrates are a plastic.

30. The device of claim 29, wherein the plastic first and second substrates are selected from the group consisting of acrylics, urethanes, polystyrenes, polycarbonates, styrene-acrylonitrile copolymers, styrene-butadiene copolymers, cellulosics, acrylonitrile-butadiene-styrene, polyvinylchloride, thermoplastic polyesters, polypropylene, nylons, polyester carbonates, ionomers, polyethyleneterephthate, and cyclic olefin copolymers.

31. The device of claim 1, wherein the electrolytic solution is a solution containing water.

32. The device of claim 31, wherein the electrolytic solution further comprises a gelling agent to form a gel electrolyte.

33. The device of claim 32, wherein the gelling agent is selected from the group consisting of gelatin, polyacrylamide, polyacrylates derived from polyacrylic acid, polyvinylalcohol, polyvinylpyrrolidone, cellulose derivatives, polyethylene glycols, polyethylene oxides, pectin, tragacanth, alginates, starches, xanthan gum, guar gum, acacia, bentonite, and cetostearyl alcohol.

34. The device of claim 31, wherein the electrolytic solution is contained within a solid matrix.

35. The device of claim 34, wherein the solid matrix is selected from the group consisting of finely divided electrically insulating powders, porous polymers, insulating sponges, insulating felts, and ormasils.

36. The device of claim 1, wherein the electrolytic solution is a non-aqueous solution.

37. The device of claim 36, wherein the electrolytic solution further comprises an electrochemically inert gelling agent to form a non-aqueous gel electrolyte.

38. The device of claim 37, wherein the gelling agent is a soluble polymer.

39. The device of claim 38, wherein the soluble polymer gelling agent is selected from the group consisting of polyacrylamide, polyacrylic acid, polyacrylonitrile, polycarbonate resin, polymethylmethacrylate, polypropylenecarbonate, polyvinylalcohol, polystyrenes, polyvinylchloride, polyvinylidinefluoride, and polyvinylpyrrolidone.

40. The device of claim 36, wherein the electrolytic solution is contained within a solid matrix.

41. The device of claim 40, wherein the solid matrix is selected from the group consisting of finely divided electrically insulating powders, porous polymers, insulating sponges, insulating felts, and ormasils.

42. The device of claim 1, wherein said solvent is selected from the group consisting of dimethylsulfoxide (DMSO), ethylene carbonate, ethylene glycol, γ-butyrolactone (GBL), glycerol, propylene carbonate, dimethylformamide (DMF), and water, and mixtures thereof.

43. The device of claim 1, wherein said electrodepositable mirror metal is selected from the group consisting of silver, bismuth, copper, tin, cadmium, mercury, indium, lead, antimony, thallium and zinc.

44. The device of claim 1, wherein said halide or pseudohalide compound is selected from the group consisting of chloride, bromide and iodide compounds.

45. The device of claim 1, wherein said halide or pseudohalide compound is selected from the group consisting of cyanide and thiocyanate compounds.

46. The device of claim 1, wherein said halide or pseudohalide compound includes at least one cation selected from the group consisting of lithium, sodium, potassium, rubidium, cesium, magnesium, calcium, strontium, barium, alkylammonium cations and hydrogen.

47. The device of claim 1, wherein the total molar concentration ratio of halide and/or pseudohalide anions to the total molar concentration of said electrodepositable mirror metal cations is at least 10:1.

48. A reversible electrochemical mirror device for controlling the reflection of electromagnetic radiation, comprising:

a first substrate which is substantially transparent to at least a portion of the spectrum of electromagnetic radiation;

a first electrode which is disposed on the first substrate and which is substantially transparent to at least said portion of the spectrum of electromagnetic radiation;

a surface modification layer disposed on the first electrode;

a second substrate;

a second electrode which is disposed on the second substrate;

an electrolytic solution disposed between and in electrical contact with the first and second electrodes, said electrolytic solution comprising:

a solvent, a source of cations of at least one electrodepositable mirror metal, at least one halide and/or pseudohalide compound having cations that are not electroactive in the voltage range over which the device is operated, the ratio of the total molar concentration of halide and/or pseudohalide anions (where said total is the aggregate of anions originating from said halide and/or pseudohalide compound and anions originating from said source of said electrodepositable mirror metal cations) to the total molar concentration of said electrodepositable mirror metal cations being greater than 6:1; and a plurality of atoms of said electrodepositable mirror metal disposed on either the first or the second electrode, such that a negative electrical potential applied to the first electrode relative to the second electrode tends to cause deposited metal to be dissolved from the second electrode into the solution and to be electrodeposited from the solution as a mirror deposit onto the first electrode, and such that a positive electrical potential applied to the first electrode relative to the second electrode tends to cause deposited metal to be dissolved from the first electrode into the solution and electrodeposited from the solution onto the second electrode, the amount of deposited metal subsisting on the first electrode affecting the reflection of electromagnetic radiation by the device.

49. A reversible electrochemical mirror device for controlling the reflection of electromagnetic radiation, comprising:

a first substrate which is substantially transparent to at least a portion of the spectrum of electromagnetic radiation;

a first electrode which is disposed on the first substrate and which is substantially transparent to at least said portion of the spectrum of electromagnetic radiation;

a surface modification layer disposed on the first electrode;

a second electrode;

an electrochemically stable metal layer deposited on the second electrode;

an electrolytic solution disposed between and in electrical contact with the first and second electrodes, said electrolytic solution comprising:

a solvent, a source of cations of at least one electrodepositable mirror metal, at least one halide and/or pseudohalide compound having cations that are not electroactive in the voltage range over which the device is operated, the ratio of the total molar concentration of halide and/or pseudohalide anions (where said total is the aggregate of anions originating from said halide and/or pseudohalide compound and anions originating from said source of said electrodepositable mirror metal cations) to the total molar concentration of said electrodepositable mirror metal cations being greater than 6:1; and a plurality of atoms of said electrodepositable mirror metal disposed on either the first or the second electrode, such that a negative electrical potential applied to the first electrode relative to the second electrode tends to cause deposited metal to be dissolved from the second electrode into the solution and to be electrodeposited from the solution as a mirror deposit onto the first electrode, and such that a positive electrical potential applied to the first electrode relative to the second electrode tends to cause deposited metal to be dissolved from the first electrode into the solution and electrodeposited from the solution onto the second electrode, the amount of deposited metal subsisting on the first electrode affecting the reflection of electromagnetic radiation by the device.

50. A reversible electrochemical mirror device for controlling the reflection of electromagnetic radiation, comprising:

a first substrate which is substantially transparent to at least a portion of the spectrum of electromagnetic radiation;

a first electrode which is disposed on the first substrate and which is substantially transparent to at least said portion of the spectrum of electromagnetic radiation;

a surface modification layer disposed on the first electrode;

a second, electrically insulating substrate;

a second electrode which is an electrochemically stable metal disposed on the second substrate;

an electrolytic solution disposed between and in electrical contact with the first and second electrodes, said electrolytic solution comprising:

a solvent, a source of cations of at least one electrodepositable mirror metal, at least one halide and/or pseudohalide compound having cations that are not electroactive in the voltage range over which the device is operated, the ratio of the total molar concentration of halide and/or pseudohalide anions (where said total is the aggregate of anions originating from said halide and/or pseudohalide compound and anions originating from said source of said electrodepositable mirror metal cations) to the total molar concentration of said electrodepositable mirror metal cations being greater than 6:1; and a plurality of atoms of said electrodepositable mirror metal disposed on either the first or the second electrode, such that a negative electrical potential applied to the first electrode relative to the second electrode tends to cause deposited metal to be dissolved from the second electrode into the solution and to be electrodeposited from the solution as a mirror deposit onto the first electrode, and such that a positive electrical potential applied to the first electrode relative to the second electrode tends to cause deposited metal to be dissolved from the first electrode into the solution and electrodeposited from the solution onto the second electrode, the amount of deposited metal subsisting on the first electrode affecting the reflection of electromagnetic radiation by the device.

51. A reversible electrochemical mirror device for controlling the reflection of electromagnetic radiation, comprising:

a first substrate which is substantially transparent to at least a portion of the spectrum of electromagnetic radiation;

a first electrode which is disposed on the first substrate and which is substantially transparent to at least said portion of the spectrum of electromagnetic radiation;

a surface modification layer disposed on the first electrode;

a second substrate which is substantially transparent to at least said portion of the spectrum of electromagnetic radiation;

a second electrode which is distributed in localized areas on the second substrate;

an electrolytic solution disposed between and in electrical contact with the first and second electrodes, said electrolytic solution comprising:
  a solvent,
  a source of cations of at least one electrodepositable mirror metal,
  at least one halide and/or pseudohalide compound having cations that are not electroactive in the voltage range over which the device is operated, the ratio of the total molar concentration of halide and/or pseudohalide anions (where said total is the aggregate of anions originating from said halide and/or pseudohalide compound and anions originating from said source of said electrodepositable mirror metal cations) to the total molar concentration of said electrodepositable mirror metal cations being greater than 6:1; and a plurality of atoms of said electrodepositable mirror metal disposed on either the first or the second electrode,
  such that a negative electrical potential applied to the first electrode relative to the second electrode tends to cause deposited metal to be dissolved from the second electrode into the solution and to be electrodeposited from the solution as a mirror deposit onto the first electrode, and
  such that a positive electrical potential applied to the first electrode relative to the second electrode tends to cause deposited metal to be dissolved from the first electrode into the solution and electrodeposited from the solution onto the second electrode,
  the amount of deposited metal subsisting on the first electrode affecting the reflection of electromagnetic radiation by the device.

* * * * *